(12) United States Patent
Vacanti et al.

(10) Patent No.: US 9,354,298 B2
(45) Date of Patent: *May 31, 2016

(54) LOW POWER, SPACE COMBINED, PHASED ARRAY RADAR

(71) Applicant: Honeywell International Inc., Morristown, NJ (US)

(72) Inventors: David C. Vacanti, Renton, WA (US); Marc Pos, Duvall, WA (US)

(73) Assignee: Honeywell International Inc., Morris Plains, NJ (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/107,089

(22) Filed: Dec. 16, 2013

(65) Prior Publication Data

US 2014/0292561 A1 Oct. 2, 2014

Related U.S. Application Data

(63) Continuation of application No. 13/011,771, filed on Jan. 21, 2011, now Pat. No. 8,633,851.

(60) Provisional application No. 61/306,271, filed on Feb. 19, 2010.

(51) Int. Cl.
*G01S 13/44* (2006.01)
*G01S 7/03* (2006.01)
(Continued)

(52) U.S. Cl.
CPC . *G01S 7/03* (2013.01); *G01S 13/44* (2013.01); *H01Q 3/34* (2013.01); *G01S 2013/0254* (2013.01)

(58) Field of Classification Search
CPC ... G01S 13/44; G01S 2013/0254; G01S 7/03; H01Q 3/34
USPC ................................................ 342/149, 200
See application file for complete search history.

(56) References Cited

U.S. PATENT DOCUMENTS 5,003,314 A * 3/1991 Berkowitz ............ G01S 7/4017
342/174
5,353,033 A * 10/1994 Newberg .............. H01Q 3/2676
342/154

(Continued)

FOREIGN PATENT DOCUMENTS

| EP | 0733913 A2 | 9/1996 |
|----|------------|--------|
| JP | 4310887 B2 | 8/2009 |
| JP | 2010212895 A | 9/2010 |

OTHER PUBLICATIONS

Klembowski W. et al., Trends in radar technology and PIT achievements, Microwaves, Radar and Wireless Communications, 2004, 15th International Conference on Warsaw, Poland May 17-19, 2001, Piscataway, NJ, USA, IEEE, vol. 1, 17, pp. 77-85.

(Continued)

*Primary Examiner* — Timothy A Brainard
(74) *Attorney, Agent, or Firm* — Shumaker & Sieffert, P.A.

(57) ABSTRACT

A radar system including a plurality of mini radars may be conformable to a structure that it is attached or built into. A radar system includes a clock, a plurality of frequency modulated/continuous wave (FM/CW) radar units in signal communication with the clock and a processor in signal communication with the plurality of FM/CW radar units. Each of the plurality of FM/CW radar units includes a row of antenna elements.

20 Claims, 9 Drawing Sheets

(51) Int. Cl.
*H01Q 3/34* (2006.01)
*G01S 13/02* (2006.01)

(56) References Cited

U.S. PATENT DOCUMENTS

| | | | |
|---|---|---|---|
| 6,950,631 B2 | 9/2005 | Solbach | |
| 7,161,527 B2 | 1/2007 | Vacanti | |
| 7,239,266 B2 | 7/2007 | Vacanti | |
| 7,298,217 B2 | 11/2007 | Adlerstein et al. | |
| 7,492,313 B1 | 2/2009 | Ehret et al. | |
| 7,876,261 B1 | 1/2011 | Adams | |
| 8,633,851 B2* | 1/2014 | Vacanti | G01S 7/03 342/149 |
| 2002/0128052 A1* | 9/2002 | Neagley | G01S 13/756 455/575.1 |
| 2002/0154054 A1* | 10/2002 | Small | G01S 7/28 342/201 |
| 2005/0083231 A1 | 4/2005 | Drentea | |
| 2006/0061505 A1 | 3/2006 | Kinghorn | |
| 2006/0273959 A1* | 12/2006 | Kawasaki | H01Q 3/267 342/368 |
| 2007/0097012 A1 | 5/2007 | Sanelli et al. | |
| 2008/0117105 A1* | 5/2008 | Chen | G01S 3/22 342/427 |
| 2008/0291087 A1* | 11/2008 | Tietjen | G01S 7/03 342/372 |
| 2009/0273517 A1* | 11/2009 | Thiesen | H01Q 21/065 342/372 |
| 2010/0112952 A1* | 5/2010 | Molnar | H01Q 1/246 455/63.1 |
| 2010/0225528 A1 | 9/2010 | Shijo et al. | |

OTHER PUBLICATIONS

Skolnik, Cheston T and Frank JC, Chapter 7: Phased Array Antennas, Jan. 1, 1990, Radar Handbook (2nd Edition), New York, NY, pp. 7.1-7.1.82.

Skolnik, David Murrow, Chapter 20: Height Finding and 3D Radar, Jan. 1, 1990, Radar Handbook (2nd Edition), New York, NY, pp. 20/1-20/40.

A.G. Huizing, et al., Compact Scalable Multifunction RF Payload for UAVs with FMCW Radar and ESM Functionality, Business Unit Observation Systems, TNO Defence, Security and Safety, The Hague, The Netherlands, Oct. 2008.

Dr. Chujen Lin, Ultra-wideband collision avoidance sensor for UAV, Intelligent Automation, Inc., 2008.

Notice of Reason for Rejection, and translation thereof, from Counterpart Japanese Patent Application No. 2011031043, dated Sep. 30, 2014, 5 pp.

* cited by examiner

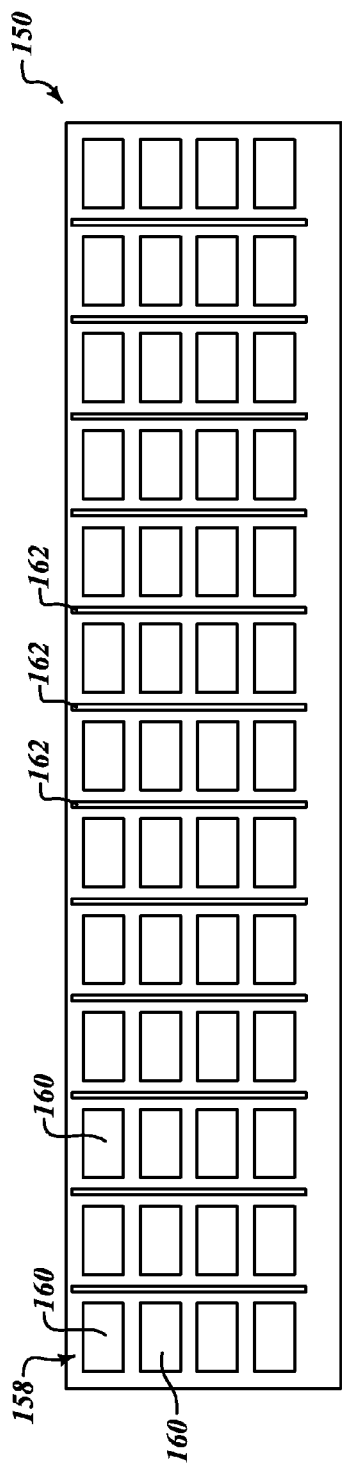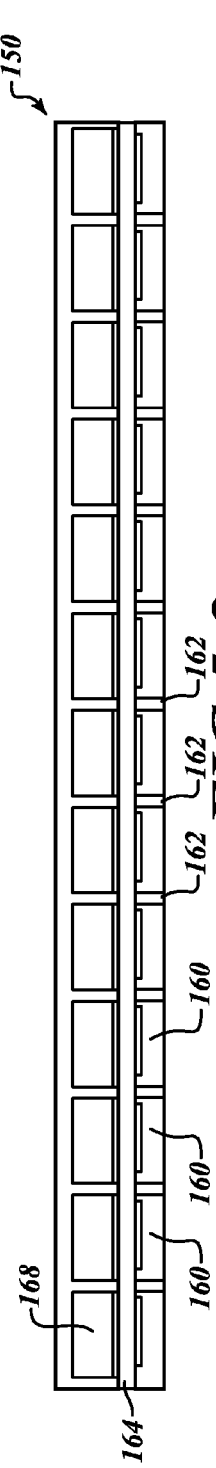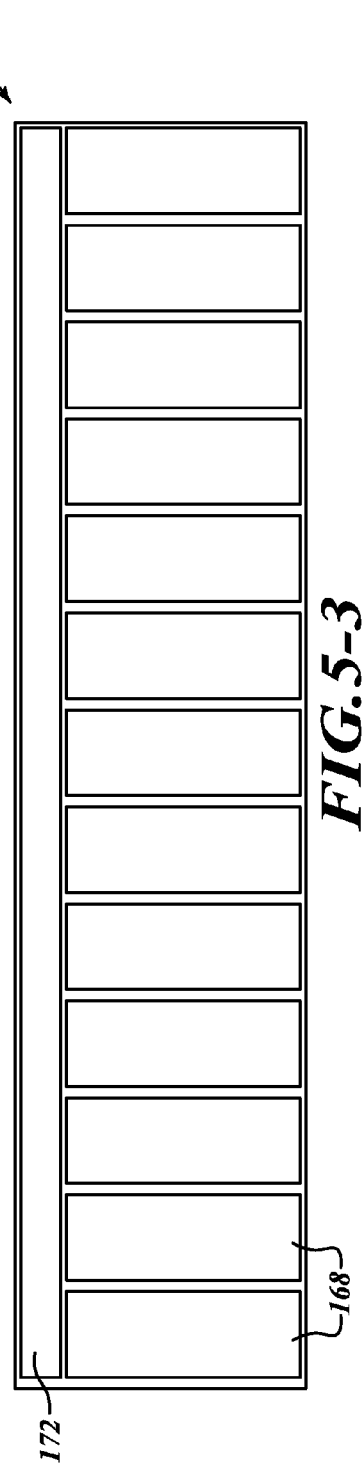

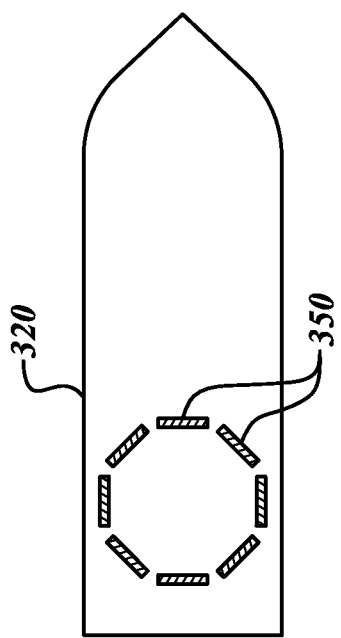

LOW POWER, SPACE COMBINED, PHASED ARRAY RADAR

This application is a continuation of application Ser. No. 13/011,771 by Vacanti et al., filed Jan. 21, 2011 and entitled, "LOW POWER, SPACE COMBINED, PHASED ARRAY RADAR," which claims the benefit of U.S. Provisional Application 61/306,271 by Vacanti et al., filed Feb. 19, 2010 and entitled, "LOW POWER, SPACE COMBINED, PHASED ARRAY RADAR", the entire content of each of which are hereby incorporated by reference.

BACKGROUND OF THE INVENTION

Current radar applications, in particular marine radar, are expensive, have significant weight, and have less than optimal range resolution. Some applications require a simple mechanically scanned array and some applications require electronic beam steering for high-speed review of a scanned volume. Also, these applications are ineffective at covering exceptionally large scanned volumes, such as on unmanned aerial vehicles (UAVs) where hemispheres of coverage are required with very low weight (a few pounds to a few tens of pounds) and very low aerodynamic drag. Previous design efforts have shown that active phased arrays (every element has its awn transmit, receive, amplitude, and phase control) are expensive, complex, and heavy. Also, passive phased arrays with a central high-powered. transmitter and passive low-pass phase shifters are less complex and have many advantages, but they are inefficient with RF transmission losses on both transmit and receive sides, despite all efforts to control losses in the power distribution network.

SUMMARY OF THE INVENTION

The present invention provides a radar that will permit: 1) a simple fixed beam; 2) electronic beam steering via coherent phase locked loop (PLL) phase shifts among the elements or subarrays; and/or 3) digital beam forming via digital phase adjustment and amplitude weighting of samples. Digital beam farming permits beam steering and the potential for multiple simultaneous beams.

The present invention includes a plurality of mini radars that make the radar system conformable to the structure that it is attached or built into. Phase errors caused by arbitrary curvature of a vessel or fuselage or vehicle, etc., can be corrected at each distributed mini radar. The phase error caused by the physical location of the mini-radar is compensated by a phase or frequency offset in addition to the nominal phase shift needed for beam steering and amplitude toss due to angular offset can be compensated by a digital amplitude multiplier.

BRIEF DESCRIPTION OF THE DRAWINGS

Preferred and alternative embodiments of the present invention arc described in detail below with reference to the following drawings:

FIG. 5-1 is a front plan view of a radar system in accordance with an embodiment of the present invention;

FIG. 5-2 is a top view of the radar system of FIG. 5-1;

FIG. 5-3 is a back plan view of the radar system of FIG. 5-1;

FIG. 9 is a top view of a vehicle with multiple radar systems described in any of the previous figures.

DETAILED DESCRIPTION OF THE INVENTION

Figure 1:
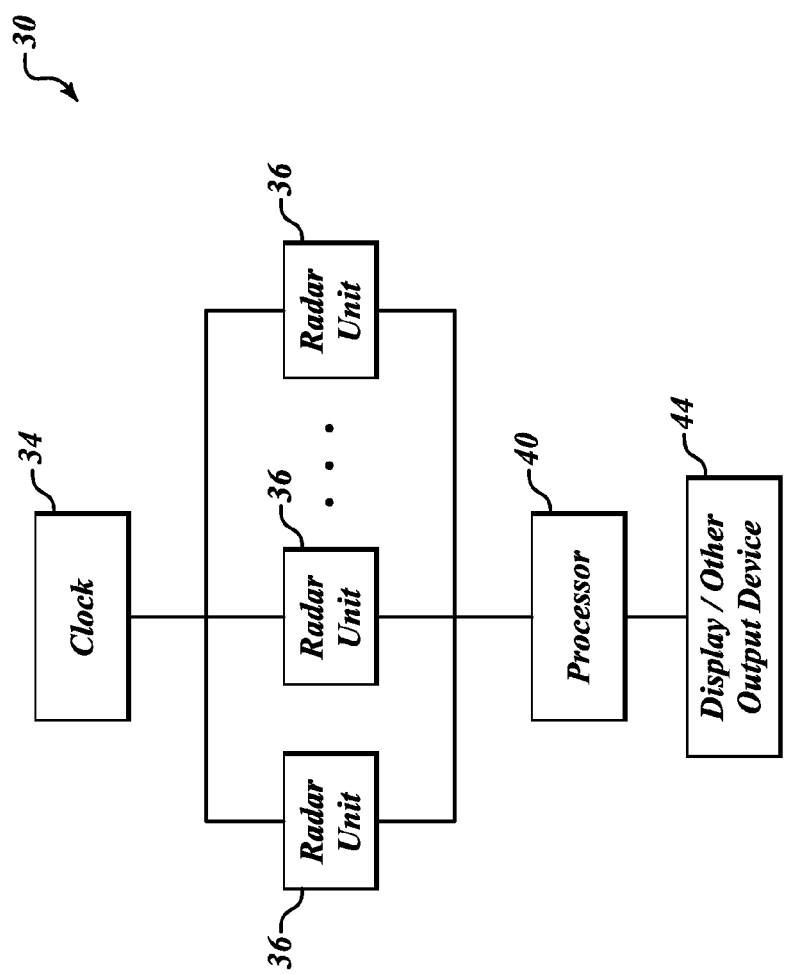
FIG. 1 is a block diagram of a radar system formed in accordance with an embodiment of the present invention.

FIG. 1 illustrates an exemplary radar system 30 that includes multiple radar units 36 (mini frequency-modulated/continuous-wave (FM/CW) radars or Linear FM Pulse Compression). Each of the radar units 36 is phase locked to a master timing oscillator (a clock 34). Each radar unit 36 can have its transmitted modulation phase or FFT Processed receive signal adjusted (I&Q FFT Outputs multiplied by complex weight) such that a passive phase shifter function in a common phased array is performed. Also, output power from each of the radar units 36 is adjustable to allow amplitude taper on an array of antennas, to adjust beam steering, or both.

The system 30 includes a processor 40 that is connected to each of the radar units 36 and a display or other type of output device 44 that is in signal communication with the processor 40. Adjusting the relative phase of digital phase lock loops within each of the radar units 36 permits electronic beam steering, electronic beam farming, or both. Also, an output level of transmitters within each of the radar units 36 is adjustable by electronic programming, such that an amplitude taper is applied across an antenna located within the radar units 36 to achieve low side lobe levels or multiple digitally formed beams.

Figure 2:
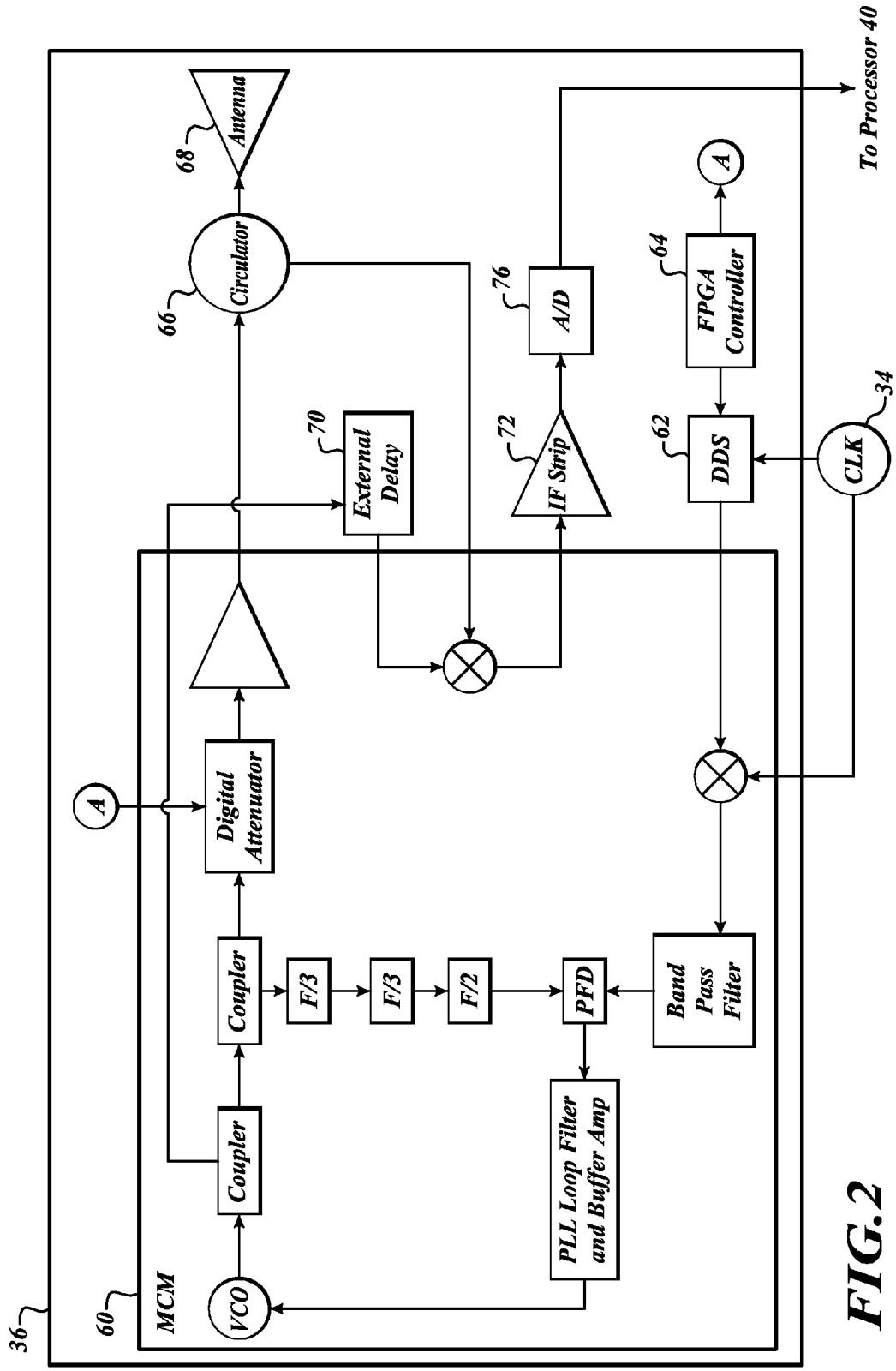
FIG. 2 is a schematic diagram of a circuit design used in the system shown in FIG. 1.

FIG. 2 illustrates details of the radar unit 36. The radar unit 36 includes a multichip module (MCM) 60 that includes Pulse Compression or FM/CW radar components such as that described in U.S. Pat. No. 7,239,266, issued Jul. 3, 2007, which is herein incorporated by reference. The radar unit 36 also includes a direct digital synthesizer (DDS) 62, a programmable logic device (PLD) or a field-programmable gate array (FPGA) controller 64, an intermediate frequency (IF) strip 72, an analog-to-digital (A/D) converter 76, an external delay component 70, a circulator 66, and an antenna array 68 (see element or sub-array 160 in FIGS. 5-1 and 5-2). The FPGA controller 64 controls the DDS 62 and a digital attenuator 80 located within the MCM 60. The external delay component 70 causes a delay of a signal produced by a voltage control oscillator (VCO) 82 and sends that signal to a first mixer 84 within the MCM 60. The first mixer 84 within the MCM 60 combines the signal delayed by the external delay component 70 with a signal received by the antenna array 68 via the circulator 66. The output of the first mixer 84 is sent to the IF strip 72, that amplifies and applies a high pass filter and a band-limiting low-pass filter to the signal and sends the resulting signal to the A/D converter 76, which converts the signal to digital and sends it to the processor 40. The MCM 60 produces a transmission signal that is outputted by the antenna element or sub-array 68, 160 via the circulator 66. The clock 34 is connected to the DDS 62 and a second mixer 86 within the MCM 40. The second mixer 86 adds the output of the DDS 62 to the clock signal to produce a signal that is sent to a Phase-Frequency Detector (PM) 88 as a variable frequency reference after filtering. The PFD 88 compares the upconverted DDS signal with a divided-down signal from the output of the VCO 82. The difference in frequency and or phase between the two signals is converted into an error voltage for delivery to a phased-locked loop (PLL) filter and buffer amplifier 90 that produces a control signal for the VCO 82. If the physical size of the phase lock loop buffer amplifier 90 or any passive elements in filter are too large to be included in the MCM they may be added externally to the MCM.

The FPGA controller 64 includes memory and or computational capability to generate the desired modulation waveforms. The FPGA controller 64 connects to the DDS 62 and the digital attenuator 80 via a high-speed serial or parallel data bus.

The antenna element or sub-array 68, 160 is directly integrated with the other components of the radar unit 36 in order to provide a radar signal with a very low voltage standing wave ratio (VSWR) (less than 1.2:1) across an entire operating bandwidth. Also, phase noise of the radar unit 36 is not worse than approximately −100 dBc/Hz at 100 KHz offset from the transmit frequency. The phase noise is cancelled at the first mixer 84, due to the output of the external delay component 70. In other words, the time of arrival of energy reflected from an input port of the antenna element or sub-array 160 arrives at virtually the same time as the local oscillator signal (signal outputted by the VCO 82 within the MCM 60).

The phase noise of the clock 34 is less than −145 dBc/Hz at 100 KHz from the clock frequency. The low phase noise of the clock 34 assures that any multiplication of this phase noise within the MCM 60 remains acceptably low and that the A/D clock supplied by a frequency divider from the master clock 34 is achieved with exceptionally low jitter, thus assuring maximum possible signal-to-noise ratio.

Figure 3:
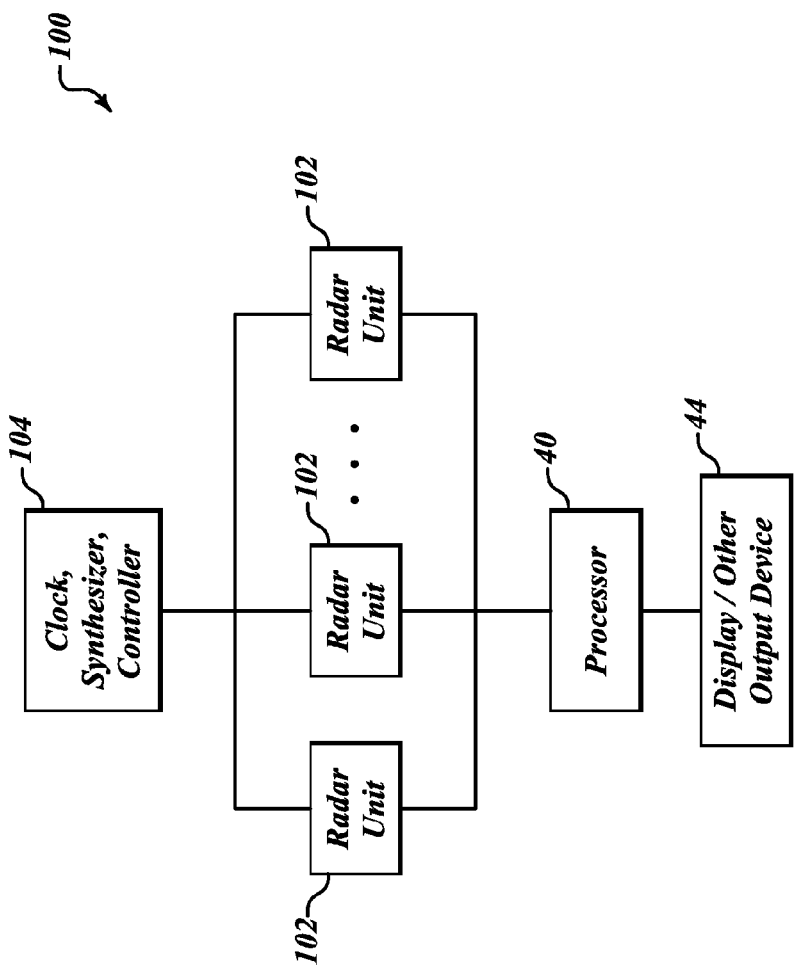
FIG. 3 is a block diagram of a radar system formed in accordance with an alternate embodiment of the present invention.

The DDS 62 provides a sweep reference frequency and includes a digital-to-analog (D/A) converter having at least twelve bits for the lowest possible phase noise. FIG. 3 illustrates a radar system 100 formed in accordance with an alternate embodiment of the present invention. The radar system 100 includes one or more radar units 102 that are connected to a common clock, synthesizer, and controller 104. Like the radar system 30, the radar units 102 are connected to the processor 40, which is then in signal communication with the output device 44.

Figure 4:
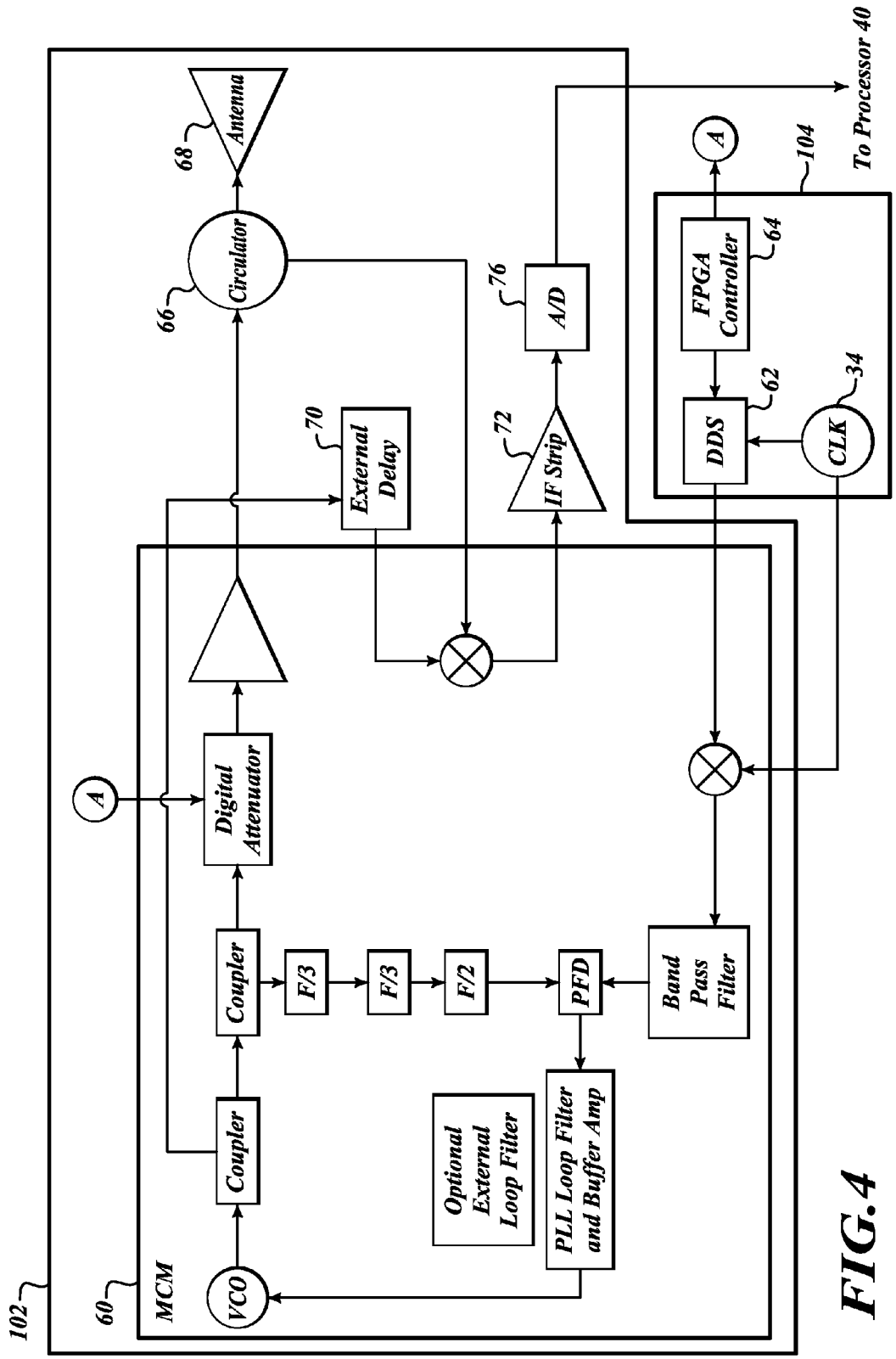
FIG. 4 is a schematic diagram of a circuit design used in the system shown in FIG. 3.
Figure 6:
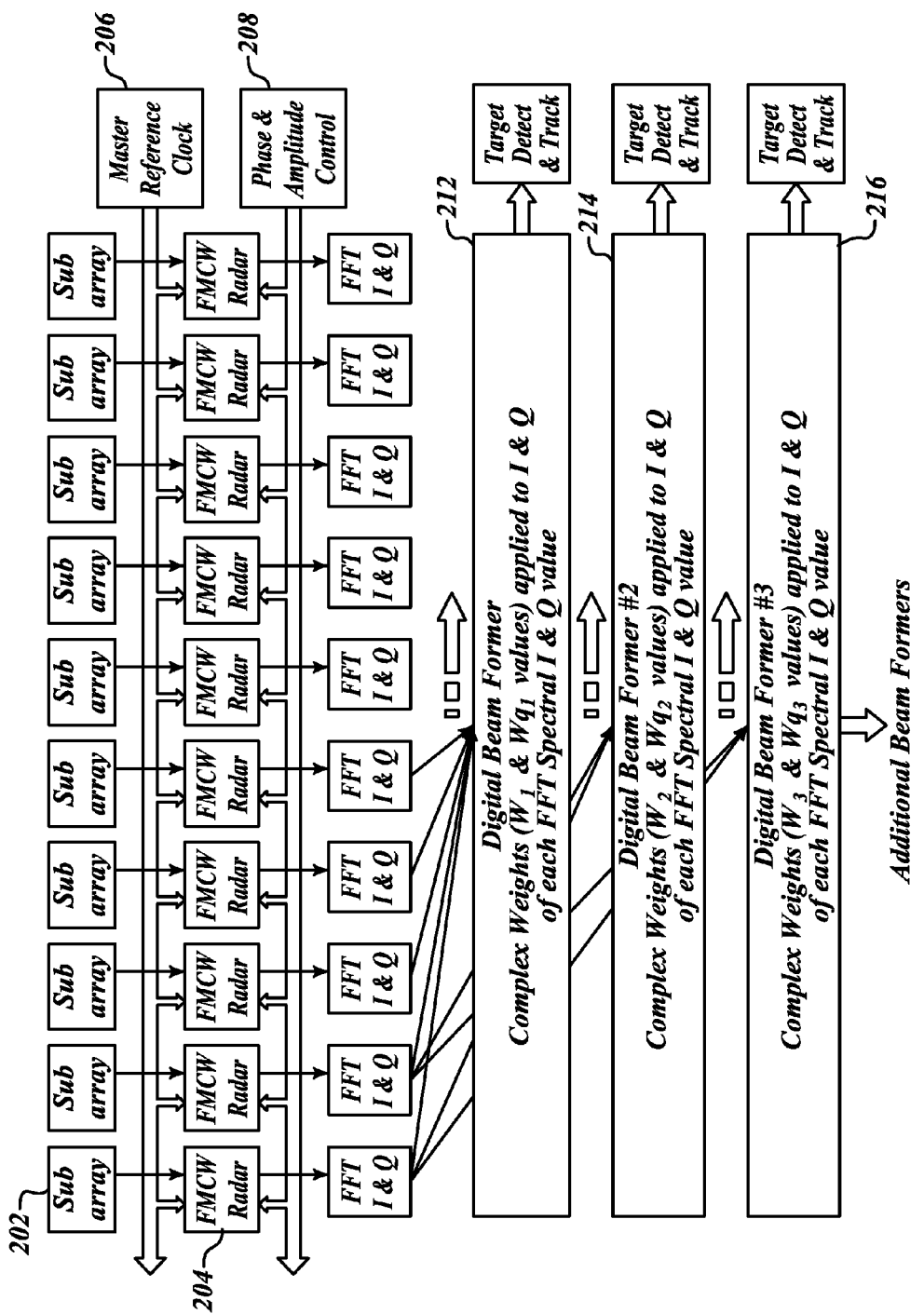
FIG. 6 is a block diagram of a first example radar system.
Figure 8:
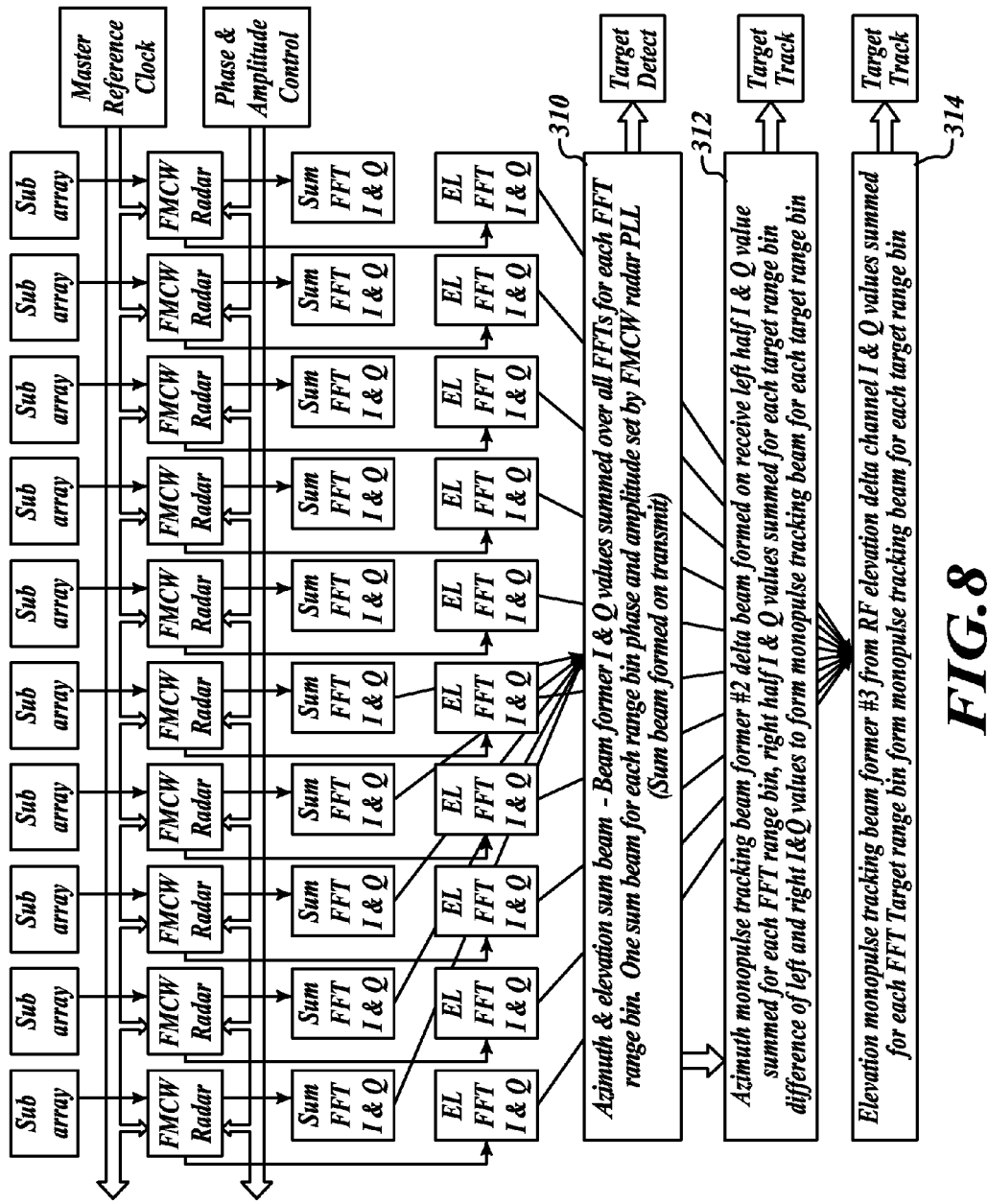

As shown in FIG. 4, each of the radar units 102 includes the MCM 60, the external delay unit 70, the circulator 66, the antenna array 68, the IF strip 72, and the A/D converter 76. The connections of these components are similar to that of the radar unit 36 shown in FIG. 2. The clock, synthesizer, controller unit 104 includes the master clock 34, the DDS 62, and the FPGA controller 64 that are connected in a similar manner as that described with regard to the radar units 36, as shown in FIG. 2. Because the radar units 102 share one DDS and FPGA controllers with other radar units 102, digital steering of radar signals produced by the plurality of radar units 102 cannot be performed like they can in the radar system 30 described above. This configuration is used where a transmitted beam steering is not required but multiple digitally formed receive beams are required. The single source of modulation and clock reference produces a single beam that may be divided into sub-regions by multiple receive beams formed as shown in FIG. 6 or 8.

FIGS. 5-1, 5-2, and 5-3 illustrate an exemplary layout of thirteen radar units 168 coupled to corresponding vertical antenna arrays 158. In this embodiment, each of the vertical antenna arrays 158 includes four antenna elements 160 (i.e., microstrip patch elements). The vertical antenna arrays 158 are separated by an isolation wall 162. An exemplary isolation wall is formed of a carbon fiber material or a comparable material for performing 25 to 30 dB isolation between the vertical antenna arrays 158. The antenna elements 160 and the isolation walls 162 are mounted to an antenna circuit board 164.

Each of the radar units 168 is mounted to radar circuit boards. The radar circuit boards are mounted to the antenna circuit board 164 on a side that is opposite the antenna elements 160. Located above the radar units 168 is a circuit component 172. Electrical traces connect the antenna elements 160 through the antenna circuit board 164 to their respective radar units 168 or the circuit component 172. The circuit component 172 includes the master clock 34, such as that shown in FIGS. 1 and 2, or includes the master clock 34, the DDS 162, and the FPGA controller 64, such as that shown in FIGS. 3 and 4.

Multiple transmit beams may also be formed simultaneously. The multiple transmit beams are formed by combining subsections of the available overall array to form individual beams. For example, if there are 12 array elements in azimuth fed by 12 "mini-radars" then one beam is produced on the left from the left most 6 elements and another beam is produced on the right with the other half. A beam will be formed independently for each subset of associated modules.

Beam transmission can take on a dynamic quality. For example, for a short period one beam is transmitted then in the next moment two beams are transmitted independently. The available power associated with each transmit beam is reduced in direct proportion to the number of beams that are formed. The receive beams that can be formed are constrained to exist within the illumination of each transmit beam. So the larger the number of transmit beams the greater the beamwidth and the more scanning volume is available within the beam. Technically the digital beam forming can create a beam that points in any desired direction, however if no transmitter power is radiated in the steered direction then no target power can be received from that direction. There may be other reasons for steering to look Where no signals were transmitted. For example, it is possible to locate the direction of a jammer by locating the max detected power, or to listen to a broadcast data transmission from a source that is not a radar. The present invention allows for simultaneous datalinking and radar operations.

FIG. 6 illustrates a plurality of subarray antennas 202 similar to those described above, each of which is connected to a separate FM/CW or Pulse Compression radar 204 with a master clock 206 that sends a clock signal to each of the FM/CW or Pulse Compression radars 204, This is similar to the radar system 100 shown in FIG. 3. A phase and amplitude controller 208 (e.g., DSP Controller) sends phase and amplitude control signals to each of the FM/CW or Pulse Compression radars 204, similar to that shown in FIGS. 3 and 4 at Point A. The outputs of the FM/CW radars 204 are sent to a processor (e.g., the processor 40). The processor performs a fast-Fourier transform (FFT) of the received signals from the FM/CW radars 204 to produce spectral I and Q values. The processor then performs one or more digital beam-forming processes (see blocks 212-216) that electronically steer the beam by re-using the original FFT I&Q data with appropriate complex weights and summation.

The quadrature baseband I and Q values can be used to represent a radio signal as a complex vector (phasor) with real and imaginary parts. Two components are required so that both positive and negative frequencies (relative to the channel center frequency) can be represented as follows:

$s(t) = x(t) + j\, y(t)$ $s(t)$ is the complex baseband signal $x(t) = i(t)$ is the real part y(t)=−q(t) is the imaginary part
j is $\sqrt{-1}$.

For beamforming, the complex baseband signals are multiplied by the complex weights to apply the phase shift and amplitude scaling required for each antenna element.

$w_k = a_k e^{j\sin(\theta k)}$
$w_k = a_k \cos(\theta_k) + j a_k \sin(\theta_k)$
$w_k$ is complex weight for the $k^{th}$ antenna element
$a_k$ is the relative amplitude of the weight
$\theta_k$ is the phase shift of the weight (i.e., differential phase shift), $\theta_k = 360(d/\lambda) \sin(\theta)$,
d is the spacing between antenna elements,
$\lambda$ is the freespace wavelength, and
$\theta$ is in the desired scan angle in degrees.

The amplitude weight of each element (k) is determined by a desired taper function. There are many amplitude tapers that are used across an array. A simple example is a Cosine on a pedestal—where "0" is the center of the array with a max weight of 1 plus the pedestal offset and the remaining values are scaled as from $\cos(\phi)$ plus the pedestal offset: $Amp_k = \cos(\phi) + $ offset pedestal.

A general-purpose digital signal processor (DSP) can implement the complex multiplication for each antenna element:

$$s_k(t)w_k = a_k\{[x_k(t)\cos(\theta_k) - y_k(t)\sin(\theta_k)] + j[x_k(t)\sin(\theta_k) + y_k(t)\cos(\theta_k)]\}$$

Figure 7:
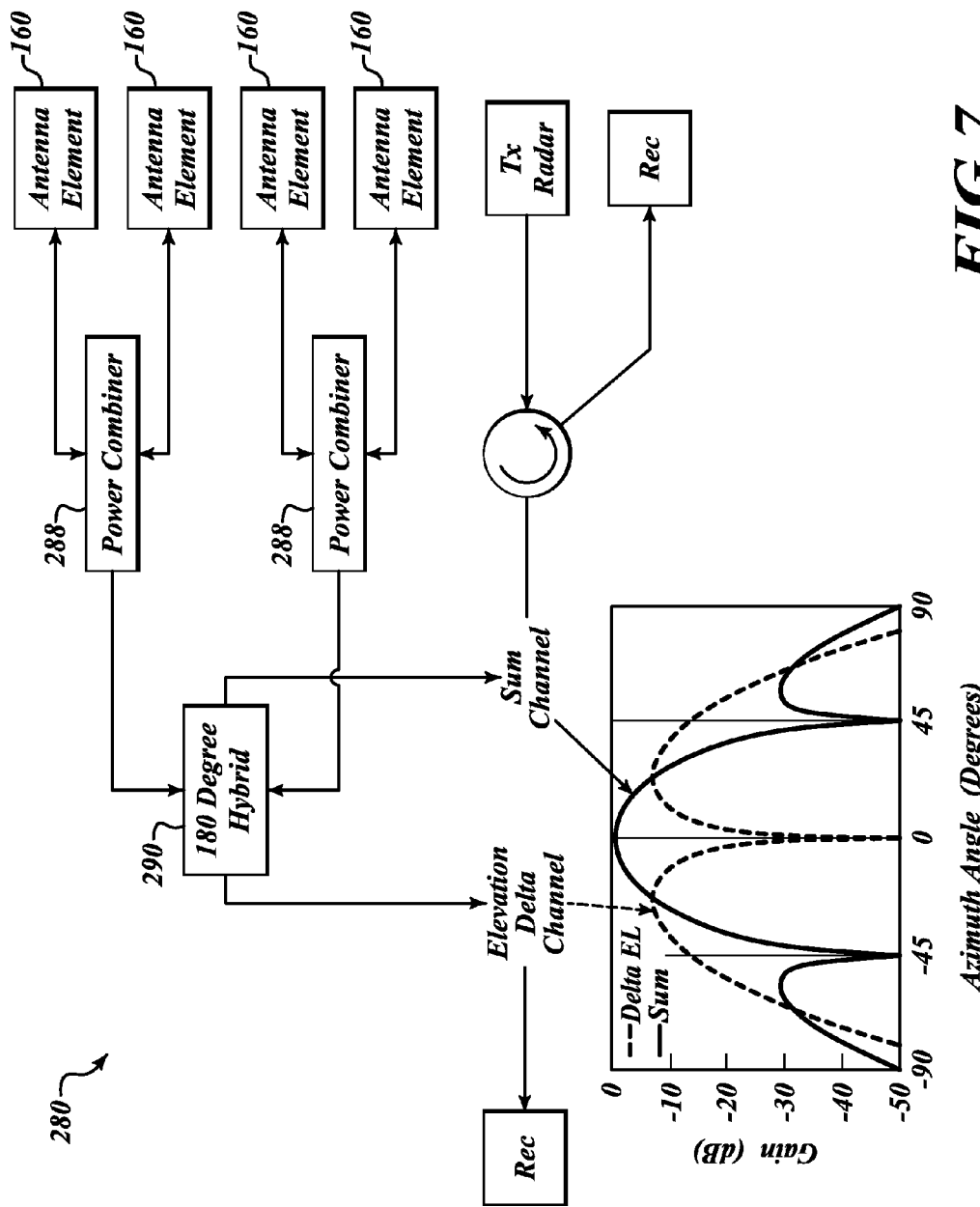
FIGS. 7 and 8 are block diagrams illustrating an elevation monopulse configuration.

FIGS. 7 and 8 illustrate a radar system 280 that performs elevation monopulse, thereby allowing more accurate elevation detection of targets. The radar system 280 includes sub-array antennae, FM/CW or Pulse Compression radars, a Master clock similar to FIG. 6. The radar system 280 also includes a combiner 288 for each pair of antenna elements 160 that is located in each antenna element array 158. The system shown in FIGS. 7 and 8 can perform EL monopulse. The phase and amplitude control is relative to each adjacent subarray column not within the each small sub-array 160. The output of each the power combiners 288 is submitted to a 180-degree hybrid component 290 that produces an elevation delta channel signal and a summation channel signal. The sum channel signal is also connected to a circulator (e.g. the circulator 66) of the radar system 280. Another receiver (not shown) receives the output of the Elevation Delta Channel. The Sum Channel is used to both transmit the signal and receive the main sum signal. The hybrid is located within the radar unit 168. A processor performs target detection using the collection of elevation summation beams from the sum channels of the 180-degree hybrid components 290. Also, the processor performs target tracking using an azimuth monopulse tracking via digital beam forming algorithm during receive processing and elevation monopulse tracking by comparing phase and amplitude of the signal in the summation channel with the phase and amplitude of the elevation delta channel.

The Azimuth and Elevation Monopulse Beam former algorithm can be expressed mathematically for Elevation Monopulse as follows: vector sum from 0 to N/2 of the upper half of all antenna elements minus the vector sum of N/2 to N of the lower half of the elements shifted by 180 degrees. Similarly, the Azimuth monopulse tracking beam is formed by the vector sum of the left half of the array and subtracting the vector sum of the right half of the array elements phase shifted by 180 degrees.

As shown in FIG. 9, several fix-mounted, electronically scanned antennas 350 coupled to a processor, as described above, are placed around a pilot house of a (marine or land-based) vehicle 320 to provide panoramic or 360-degree coverage with very high range resolution of a few feet to identify small skiffs at sea and alert security details onboard, etc. Combatants cannot readily see the simple thin active antenna structures that do not mechanically move and do not attract attention. Combatants are known to shoot at and attempt to destroy visible satellite antennas, rotating marine radar antennas. Other exemplary radar applications include, but are not limited to: 1) covert littoral small craft operations; 2) marine barge radars used within the very narrow confines of (e.g. European and U.S.) rivers, locks, and canals where marine radar carriage is mandated; and 3) antipirate applications onboard cargo ships.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   generating, by a clock on a first side of an antenna circuit board, a single clock the antenna circuit board comprising at least one isolation wall;
   sending the single clock signal to a plurality of radar units mounted on the first side of the antenna circuit board, each of the plurality of radar units comprising a frequency modulated/continuous wave (FM/CW) or Pulse Compression radar unit, each radar unit of the plurality of radar units comprising a column of two or more antenna elements mounted on a second side of the antenna circuit board, wherein the at least one isolation wall of the antenna circuit board is located between a pair of adjacent columns of the antenna elements, and wherein the first side of the antenna circuit board is opposite the second side of the antenna circuit board;
   generating at least one control signal at a first processor in signal communication with the plurality of radar units;
   transmitting radar signals from the plurality of radar units based on the at least one control signal;
   receiving radar reflection signals at the plurality of radar units; and
   sending the radar reflection signals to a second processor in signal communication with the plurality of radar units.

2. The method of claim 1, wherein transmitting radar signals comprises electrically steering the radar signals based on the at least one control signal and receiving radar reflection signals comprises electrically steering the radar signals when the antenna elements are viewing.

3. The method of claim 1, wherein transmitting radar signals comprises vertically steering the radar signals based on the at least one control signal.

4. The method of claim 3, wherein vertically steering comprises:
   receiving signals at one or more antenna elements of a first subarray of antenna elements in at least one radar unit of the plurality of radar units;
   receiving signals at one or more antenna elements of a second subarray of antenna elements in the at least one radar unit, wherein the one or more antenna elements of the first subarray are vertically separated from the one or more antenna elements of the second subarray;
   summing signals received from the first and second subarrays;
   subtracting signals received from the first and second subarrays; and
   identifying elevation of a target based on the summed and difference signals.

5. The method of claim 1, wherein transmitting radar signals comprises digitally forming one or more beams that can be transmitted in any direction.

6. The method of claim 1, wherein the antenna elements comprise microstrip elements.

7. The method of claim 1, wherein at least one radar unit of the plurality of radar units is configured to operate as an elevation monopulse unit.

8. The method of claim 1, further comprising, transmitting the radar signals from the plurality of radar units as one or more digitally formed beams in any direction based at least in part on the at least one control signal.

9. The method of claim 1, wherein the first processor is located on the first side of the antenna circuit board.

10. The method of claim 9, wherein the first processor comprises memory and a direct digital synthesizer located on the first side of the antenna circuit board, wherein the first processor is configured to generate the at least one control signal using the memory and the direct digital synthesizer.

11. The method of claim 1, wherein the antenna circuit board comprises a first antenna circuit board of a plurality of antenna circuit boards, wherein each of the plurality of antenna circuit boards is positioned to form a respective beam in a different respective direction the method further comprising:
sending a clock signal generated by a clock on a first side of a second antenna circuit board of the plurality of antenna circuit boards to a plurality of radar units mounted on the first side of the second antenna circuit board;
transmitting radar signals from the plurality of radar units mounted on the first side of the second antenna circuit board based on at least one control signal generated at a third processor in signal communication with the plurality of radar units mounted on the first side of the second antenna circuit board; and
sending radar reflection signals received at the plurality of radar units mounted on the first side of the second antenna circuit board to a fourth processor in signal communication with the plurality of radar units mounted on the first side of the second antenna circuit board.

12. The method of claim 11, wherein each of the plurality of antenna circuit boards is positioned about a central axis to form the respective beam in the different respective direction.

13. The method of claim 12, wherein the different respective directions associated with the plurality of antenna circuit boards comprise degrees of azimuth about the central axis.

14. The method of claim 12, wherein the different respective directions associated with the plurality of antenna circuit boards comprise 360 degrees of azimuth about the central axis.

15. The method of claim 12, wherein the different respective directions associated with the plurality of antenna circuit boards comprise degrees of elevation about the central axis.

16. The method of claim 11, wherein the first processor and the third processor are a first single processor and the second processor and the fourth processor are a second single processor.

17. The method of claim 11, wherein each of the plurality of antenna circuit boards is positioned about a central axis to form the respective beam in the different respective direction to provide three hundred sixty degrees of coverage around the central axis.

18. The method of claim 11, wherein the plurality of antenna circuit boards comprise a pair of antenna circuit boards respectively positioned on either side of a central axis, wherein a first antenna circuit board of the pair of antenna circuit boards is configured to point a first beam in a first direction that is offset from the central axis by a first angle in a clockwise direction with respect to the central axis, and wherein a second antenna circuit board of the pair of antenna circuit boards is configured to point a second beam in a second direction that is offset from the central axis by a second angle in a counterclockwise direction with respect to the central axis.

19. The method of claim 11, further comprising, prior to transmitting radar signals from the plurality of radar units mounted on the first side of the second antenna circuit board based on the at least one control signal generated at the third processor in signal communication with the plurality of radar units mounted on the first side of the second antenna circuit board, ceasing to transmit radar signals from the plurality of radar units mounted on the first side of the first antenna circuit board.

20. A system comprising:
means for generating, by a clock on a first side of an antenna circuit board of the system, a single clock signal, the antenna circuit board comprising at least one isolation wall;
means for sending the single clock signal to a plurality of radar units mounted on the first side of the antenna circuit board, each of the plurality of radar units comprising a frequency modulated/continuous wave (FM/CW) or Pulse Compression radar unit, each radar unit of the plurality of radar units comprising a column of two or more antenna elements mounted on a second side of the antenna circuit board, wherein the at least one isolation wall of the antenna circuit board is located between a pair of adjacent columns of the antenna elements, and wherein the first side of the antenna circuit board is opposite the second side of the antenna circuit board;
means for generating at least one control signal at a first processor in signal communication with the plurality of radar units;
means for transmitting radar signals from the plurality of radar units based on the least one control signal;
means for receiving radar reflection signals at the plurality of radar units; and
means for sending the radar reflection signals to a second processor in signal communication with the plurality of radar units.

* * * * *